US012695379B2

(12) United States Patent
Cattani

(10) Patent No.: US 12,695,379 B2
(45) Date of Patent: Jul. 28, 2026

(54) CHARGE PUMP INTEGRATION IN WIRELESS CHARGER POWER MANAGEMENT INTEGRATED CIRCUIT

(71) Applicant: STMicroelectronics International N.V., Geneva (CH)

(72) Inventor: Alberto Cattani, Cislago (IT)

(73) Assignee: STMicroelectronics International N.V., Geneva (CH)

( * ) Notice: Subject to any disclaimer, the term of this patent is extended or adjusted under 35 U.S.C. 154(b) by 642 days.

(21) Appl. No.: 18/201,931

(22) Filed: May 25, 2023

(65) Prior Publication Data

US 2024/0396442 A1 Nov. 28, 2024

(51) Int. Cl.
| | |
|---|---|
| *H02M 3/07* | (2006.01) |
| *H02J 7/90* | (2026.01) |
| *H02J 50/12* | (2016.01) |
| *H04B 5/70* | (2024.01) |

(52) U.S. Cl.
CPC .................. *H02M 3/07* (2013.01); *H02J 7/90* (2026.01); *H02J 50/12* (2016.02); *H04B 5/70* (2024.01); *H02J 2207/20* (2020.01)

(58) Field of Classification Search
CPC ....................................................... H02M 3/07
See application file for complete search history.

(56) References Cited

U.S. PATENT DOCUMENTS

| | | | |
|---|---|---|---|
| 4,727,465 A | 2/1988 | Cini et al. | |
| 8,558,586 B1 | 10/2013 | Martin et al. | |
| 11,653,152 B1 * | 5/2023 | Lahoud ................. | B06B 1/0215 |
| | | | 310/311 |
| 11,665,483 B1 * | 5/2023 | Lahoud ................. | H02M 3/157 |
| | | | 310/311 |

(Continued)

FOREIGN PATENT DOCUMENTS

| | | |
|---|---|---|
| CN | 106487218 A | 3/2017 |
| CN | 112987843 A | 6/2021 |
| WO | 2018097474 A1 | 5/2018 |

OTHER PUBLICATIONS

EP Search Report and Written Opinion for counterpart EP Appl. No. 24174795.5, report dated Nov. 18, 2024, 8 pgs.

(Continued)

*Primary Examiner* — Daniel Kessie
(74) *Attorney, Agent, or Firm* — Crowe & Dunlevy LLC

(57) ABSTRACT

A wireless charging and data transmission system that includes first and second half-bridges coupled in parallel between supply and ground nodes. Each half-bridge includes high-side and low-side transistors. A first high-side driving circuit drives the control terminal of the high-side transistor of the first half-bridge with a first bootstrap voltage at a first node, and a second high-side driving circuit drives the control terminal of the high-side transistor of the second half-bridge with a second bootstrap voltage at a second node. A charge pump circuit generates and maintains a master bootstrap voltage at a master node, which is equal (Continued)

to the voltage at the supply node plus a given voltage. A switch circuit couples the master node to the first node during the low-side conduction period of the first half-bridge and couples the master node to the second node during the low-side conduction period of the second half-bridge.

15 Claims, 2 Drawing Sheets

(56) References Cited

U.S. PATENT DOCUMENTS

| | | | |
|---|---|---|---|
| 2005/0017768 A1 | 1/2005 | de Frutos et al. | |
| 2014/0097791 A1* | 4/2014 | Lisuwandi | H04B 5/79 |
| | | | 320/108 |
| 2016/0344302 A1* | 11/2016 | Inoue | H02M 7/219 |
| 2017/0288511 A1 | 10/2017 | Oljaca et al. | |
| 2019/0267845 A1* | 8/2019 | Maniktala | H01F 38/14 |

OTHER PUBLICATIONS

Lathiya, Poonam, et al.: "Near-Field Communications (NFC) for Wireless Power Transfer (WPT): An Overview," Wireless Power Transfer, Oct. 6, 2020, 25 pgs.
Shibuya, Hiroki, et al.: "A Wireless Charging and Near-Field Communication Combination Module for Mobile Applications," 2014 Electronic Components & Technology Conference, 6 pgs.

* cited by examiner

CHARGE PUMP INTEGRATION IN WIRELESS CHARGER POWER MANAGEMENT INTEGRATED CIRCUIT

TECHNICAL FIELD

This disclosure is related to the fields of wireless charging and secure wireless data transfer, and in particular, to a system enabling the use of a single antenna for both wireless charging and secure wireless data transfer.

BACKGROUND

Mobile devices, such as smartphones, often come equipped with wireless charging circuits and associated antennas that allow for battery charging without the need for cables, using the Qi standard. These devices may also include magnetic secure transfer (MST) and/or near field communications (NFC) circuits and associated antennas that allow for secure data transfer over short distances. Due to the limited space available in mobile devices, it is desirable for a single antenna to be able to handle both wireless charging and close-range secure wireless data transfer circuits.

A challenge arises in that if a single antenna were to be used for secure data transfer over short distances, the bridge connected to the single antenna would be operated at lower than its usual operation frequency. Due to this lower operating frequency, the bootstrap capacitors within the rectifier that would otherwise be fully charged are not fully charged and, in turn, the bridge would fail to operate properly.

Given this, further development is needed to provide a dual-purpose circuit that utilizes single antenna for both wireless power transfer and close-range secure wireless data transfer.

SUMMARY

Disclosed herein is a wireless charging and data transmission system, including a full bridge formed by first and second half bridges coupled in parallel between a supply node and a ground node, with each half bridge comprised of a high-side transistor and a low-side transistor. The system also includes a first high-side driving circuit for driving a control terminal of the high-side transistor of the first half bridge with a first bootstrap voltage at a first node during each high-side conduction period of the first half bridge, and a second high-side driving circuit for driving a control terminal of the high-side transistor of the second half bridge with a second bootstrap voltage at a second node during each high-side conduction period of the second half bridge. A charge pump circuit is configured to generate and maintain a master bootstrap voltage at a master node as being equal to a voltage at the supply node plus a given voltage. A switch circuit is configured to couple the master node to the second node during each low-side conduction period of the first half bridge, and to couple the master node to the first node during each low-side conduction period of the second half bridge.

The charge pump circuit may include a charge pump configured to boost a base voltage based upon received control signals, and a switch configured to selectively couple charge pump circuit to the master node.

The charge pump circuit may also include a capacitor coupled between the master node and the voltage at the supply node and holding the master bootstrap voltage, a feedback voltage circuit coupled between the master node and ground, and configured to generate a feedback voltage representative of the master bootstrap voltage, a comparator configured to compare the feedback voltage to a reference voltage and generate a comparison output based thereupon, and a control circuit configured to generate control signals for the charge pump circuit based upon the comparison output.

The first high-side driving circuit may include a first driver powered between the first node and a voltage at a tap between the high and low side transistors of the first half bridge, and a first bootstrap capacitor coupled between the first node and the tap between the high and low side transistors of the first half bridge.

The second high-side driving circuit may include a second driver powered between the second node and a voltage at a tap between the high and low side transistors of the second half bridge, and a second bootstrap capacitor coupled between the second node and the tap between the high and low side transistors of the second half bridge.

Method aspects are disclosed herein as well. For example, disclosed herein is a method of operating a wireless charging and data transmission system including generating a master bootstrap voltage to be a first voltage above a rectified voltage, using a charge pump circuit. The method includes during low-side conduction of a first half-bridge formed by second and fourth transistors, closing a fourth switch to tie a second node to a ninth node, boosting a second bootstrap voltage above a threshold voltage that keeps a third transistor sufficiently turned on, and closing a fifth switch to charge a first bootstrap voltage to a supply voltage. The method further includes during low-side conduction of a second half-bridge formed by the first and third transistors, closing a third switch to tie the first node to an eighth node, boosting the first bootstrap voltage above a threshold voltage that keeps the fourth transistor sufficiently turned on, and closing a sixth switch to charge the second bootstrap voltage to the supply voltage. The method additionally includes generating a feedback voltage at a third node using a common-drain arrangement of a fifth transistor, the feedback voltage being representative of a difference between the master bootstrap voltage and the rectified voltage. The method furthermore includes comparing the feedback voltage to a reference voltage using a comparator, the reference voltage being representative of a desired voltage level for the master bootstrap voltage to be above the rectified voltage, and controlling operation of the charge pump circuit using a state machine based on the comparison of the feedback voltage and the reference voltage, such that the operation ceases when the feedback voltage becomes higher than the reference voltage and resumes when the feedback voltage falls below the reference voltage.

The method may also include maintaining the master bootstrap voltage as being the first voltage above the rectified voltage regardless of fluctuations in the rectified voltage as a result of the controlling of the operation of the charge pump circuit using the state machine.

Also disclosed herein is a wireless charging and data transmission system, including a full bridge formed by two half bridges, each half bridge having a high-side transistor and a low-side transistor, first and second high-side driving circuits driving the high-side transistors with bootstrap voltages (BOOT1, BOOT2) during low-side conduction periods, a charge pump circuit maintaining a master bootstrap voltage equal to a supply node voltage plus a given voltage, and a switch circuit coupling the master bootstrap voltage to first or second nodes during the respective low-side conduction periods of the half bridges.

The system may further include capacitor holding the master bootstrap voltage, a feedback circuit generating a voltage representative of the master bootstrap voltage, a comparator comparing the voltage representative of the master bootstrap voltage to a reference voltage and generating a comparison output based thereupon, and a control circuit controlling the charge pump circuit based on the comparison output.

The first high-side driving circuit may include a driver powered between the first node and a tap of the first half bridge, and a first bootstrap capacitor coupled between the first node and the tap of the first half bridge.

The second high-side driving circuit may include a driver powered between the second node and a tap of the second half bridge, and a second bootstrap capacitor coupled between the second node and the tap of the second half bridge.

Another method disclosed herein is a method of operating a wireless charging and data transmission system. This method includes driving a control terminal of a high-side transistor of a first half bridge of a full bridge with a first bootstrap voltage at a first node during each high-side conduction period of the first half bridge, driving a control terminal of a high-side transistor of a second half bridge of the full bridge with a second bootstrap voltage at a second node during each high-side conduction period of the second half bridge, generating and maintaining a master bootstrap voltage at a master node as being equal to a voltage at a supply node plus a given voltage, and coupling the master node to the second node during each low-side conduction period of the first half bridge, and coupling the master node to the first node during each low-side conduction period of the second half bridge.

The method may further include generating a feedback voltage representative of a difference between the master bootstrap voltage and a rectified voltage and controlling generation of the master bootstrap voltage so that it is maintained as being a desired voltage level above the rectified voltage.

The method may additionally include comparing the feedback voltage to a reference voltage representative of the desired voltage level for the master bootstrap voltage to be above the rectified voltage, and controlling generation of the master bootstrap voltage so that it is maintained as being the desired voltage level above the rectified voltage.

The method may furthermore include maintaining the master bootstrap voltage as being the first voltage above the rectified voltage regardless of fluctuations in the rectified voltage as a result of the controlling of the operation of the charge pump circuit using the state machine.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Figure 1:
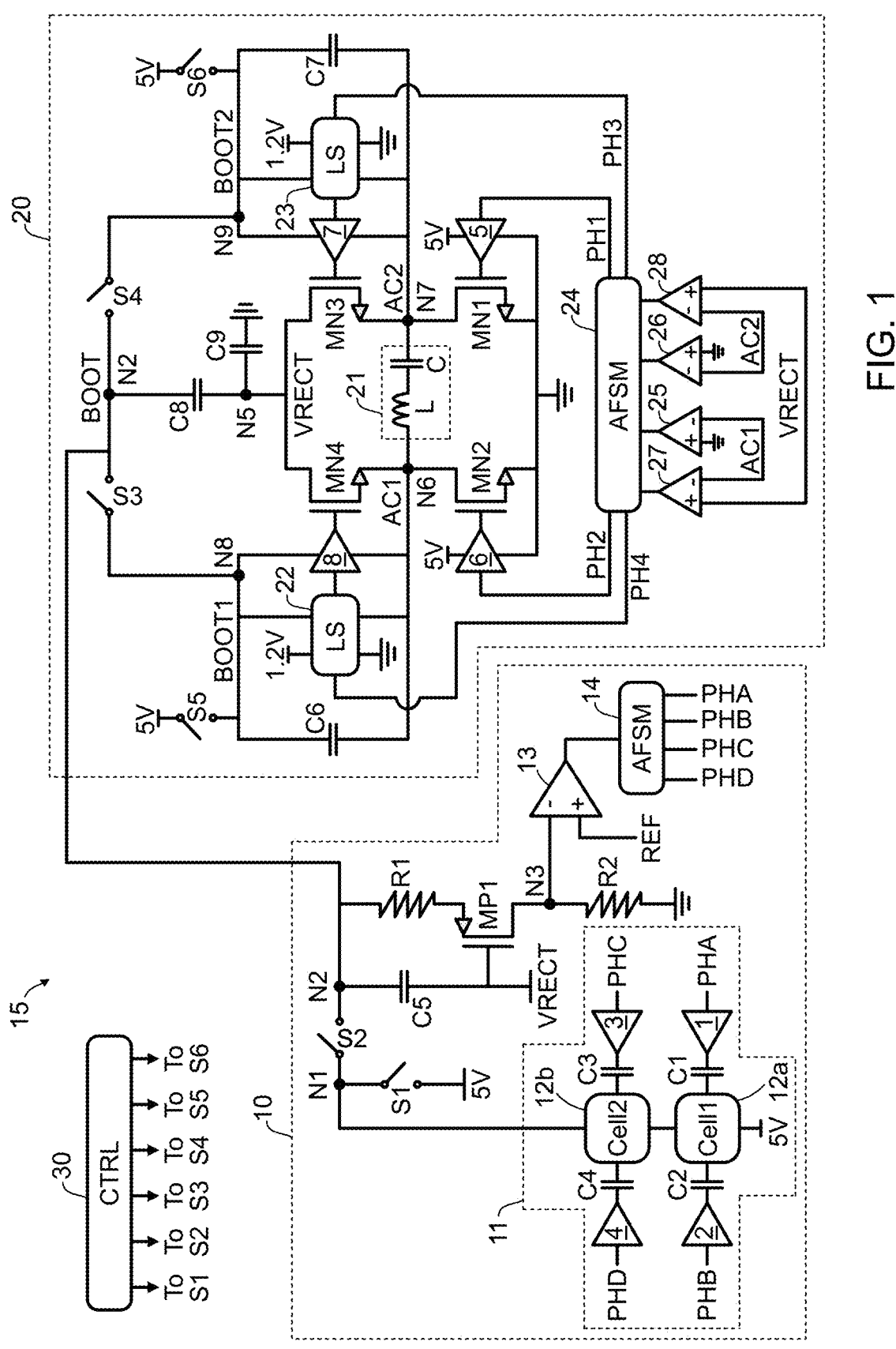
FIG. 1 is a schematic diagram of a wireless charging and data transmission system disclosed herein.

Now described with reference to FIG. 1 is a wireless charging and data transmission system 15 including a charge-pump circuit 10 and a full bridge circuit with a boostrap circuit 20. The charge pump circuit 10 includes the pumping cells 11 coupled between a first voltage (e.g., 5V) and a first node N1, with a switch S1 being connected to selectively short node N1 to the first voltage. A switch S2 is connected between nodes N1 and N2. A p-channel MOSFET transistor MP1 has its source coupled to node N2 through a resistor R1 and its drain coupled to node N3. A capacitor C5 is connected between node N2 and the gate of transistor MP1, with the gate of transistor MP1 also being connected to receive a rectified voltage VRECT (e.g., a battery voltage) from the full bridge circuit 20. A resistor R2 is connected between node N3 and ground. A comparator 13 has its non-inverting input coupled to a reference voltage REF, its inverting input coupled to node N3, and its output coupled to a state machine 14 which generates the control signals PHA, PHB, PHC, and PHD used to operate the pumping cells 11. Note that the control signals PHA, PHB, PHC, and PHD can be considered to be clock signals, with PHA and PHB being opposite in phase and with PHC and PHD being opposite in phase.

The charge pump circuit 10 is arranged as a two-stage hysteretic asynchronous charge pump circuit that utilizes two charge pumping cells 12a and 12b for multiplication to generate the master bootstrap voltage BOOT as being a voltage sufficient to maintain the voltages BOOT1 and BOOT2 across bootstrap capacitors C6 and C7 at a desired amount (e.g., 5V) above the voltage at the floating nodes AC1 and AC2 of the full bridge circuit 20. A first capacitor C1 is coupled between a first clock buffer 1 and the charge pump cell 12a, a second capacitor C2 is coupled between a second clock buffer 2 and the charge pump cell 12a, a third capacitor C3 is coupled between a third clock buffer 3 and the charge pump cell 12b, and a fourth capacitor C4 is coupled between a fourth clock buffer 4 and the charge pump cell 12b. The control signal PHA generated by the state machine 14 is used as input to the clock buffer 1, the control signal PHB generated by the state machine 14 is used as input to the clock buffer 2, the control signal PHC generated by the state machine 14 is used as input to the clock buffer 3, and the control signal PHD generated by the state machine 14 is used as input to the clock buffer 4.

The full bridge circuit 20 includes a full bridge formed by n-channel MOSFET transistors MN1, MN2, MN3, and MN4. In particular, the full bridge includes: n-channel transistor MN1 having a drain connected to node N7, a source connected to ground, and a gate coupled to receive output from driver 5, which is driven by control signal PH1; n-channel transistor MN2 having a drain connected to node N6, a source connected to ground, and a gate coupled to receive output from driver 6, which is driven by control signal PH2; n-channel transistor MN3 having a drain connected to node N5, a source connected to node N7, and a gate coupled to receive output from driver 7; n-channel transistor MN4 having a drain connected to node N5, a source connected to node N6, and a gate coupled to receive output from driver 8. An antenna 21 (represented by series connected capacitor C and inductor L) is connected between nodes N6 and N7.

A level shifter 23 powered between node N9 (voltage BOOT2) and node N7 (voltage AC2) receives the control signal PH3 from state machine 24 and provides output to the driver 7. The bootstrap capacitor C7 is connected between nodes N9 and N7. A switch S6 is coupled to selectively short node N9 to the first voltage.

A level shifter 22 powered between node N8 (voltage BOOT1) and node N6 (voltage AC1) receives the control signal PH4 from the state machine 24 and provides output to the driver 8. The bootstrap capacitor C6 is connected between nodes N8 and N6. A switch S5 is coupled to selectively short node N8 to the first voltage.

A capacitor C9 is connected between node N5 and ground, and a bootstrap capacitor C8 is connected between nodes N5 and N2. A switch S3 selectively connects nodes N2 and N8. A switch S4 selectively connects nodes N2 and N9.

The state machine 24 receives the outputs of comparators 25, 26, 27 and 28 as input and based upon those inputs generates the control signals PH1, PH2, PH3, and PH4 based upon which the transistors MN1, MN2, MN3, and MN4 of the bridge are driven. The comparator 25 has its non-inverting input grounded, its inverting input coupled to receive the voltage AC1 from node N6, and provides its output to the state machine 24. The comparator 26 has its non-inverting input grounded, its inverting input coupled to receive the voltage AC2 from node N7, and provides its output to the state machine 24. The comparator 27 has its non-inverting input coupled to receive the rectified voltage VRECT from node N5, its inverting input coupled to receive the voltage AC1 from node N6, and provides its output to the state machine 24. The comparator 28 has its non-inverting input coupled to receive the rectified voltage VRECT from node N5, its inverting input coupled to receive the voltage AC2 from node N7, and provides its output to the state machine 24.

Operation to receive power transmitted wirelessly to antenna 21 need not be described and is understood by those of skill in the art. Likewise, operation to transmit power wireless from antenna 21 to another nearby circuit need not be described and is understood by those of skill in the art.

However, operation at low frequency to transmit data wireless from the antenna 21 is now described. During operation, control circuitry 30 maintains switch S1 as being open and switch S2 as being closed. The control circuitry 30 operates switches S3, S4, S5, and S6 during operation as will be described below.

Before beginning the description of low frequency operation, the operation of the charge pump circuit 10 to generate the bootstrap voltage BOOT will now be described. The charge pump circuit 10 operates through two phases: a charging phase and a pumping phase. In the charging phase, capacitors C1, C2, C3, and C4 accumulate charge, each triggered by the corresponding control signals PHA, PHB, PHC, and PHD from the state machine 14. These capacitors C1, C2, C3, and C4, associated with their respective stages 12*a*, 12*b* of the charge pump circuit 10, store energy to be used in the subsequent pumping phase. During the pumping phase, the stored charge in each of these capacitors is then transferred to their respective pumping cells, 12*a* for capacitors C1 and C2 and 12*b* for capacitors C3 and C4. This charge transfer generates the energy to produce the bootstrap voltage BOOT.

In low frequency operation, conduction periods for the transistors MN1, MN2, MN3, and MN4 are substantially longer than in high frequency operation. Keep in mind that for an NMOS transistor to turn on, its gate-source voltage is to be at least equal to its threshold voltage (Vth). This does not present an issue for low-side conduction, where the sources of transistors MN1 and MN2 are connected to ground and therefore the generation of a sufficient gate voltage to turn on transistors MN1 and MN2 is not an issue.

However, for high-side conduction, a challenge arises. Since the source voltage of the high-side transistors MN3 and MN4 may be equal to the rectified voltage VRECT during operation, the gate voltage is to be at least the threshold voltage Vth above the rectified voltage VRECT. This is why conventional bootstrap circuits have been developed to charge bootstrap capacitors to at least Vth above VRECT, thereby providing a sufficient voltage to be applied to the gates of the high-side transistors MN3 and MN4 to turn them on during their respective periods of high-side conduction.

When operating at low frequency using prior art bootstrap circuits, due to the power consumption of the driving stages (e.g., drivers 6, 7, 8, and 9 as well as the level shifters 1, 2, 3, and 4) as well as the leakage currents through the high-side transistors MN3 and MN4, the bootstrap capacitors C6 and C7 (respectively holding the bootstrap voltages BOOT1 and BOOT2) may discharge to below the threshold voltages Vth of transistors MN3 and MN4, thereby impeding the ability to sufficiently turn on those transistors during high-side conduction.

Figure 2:
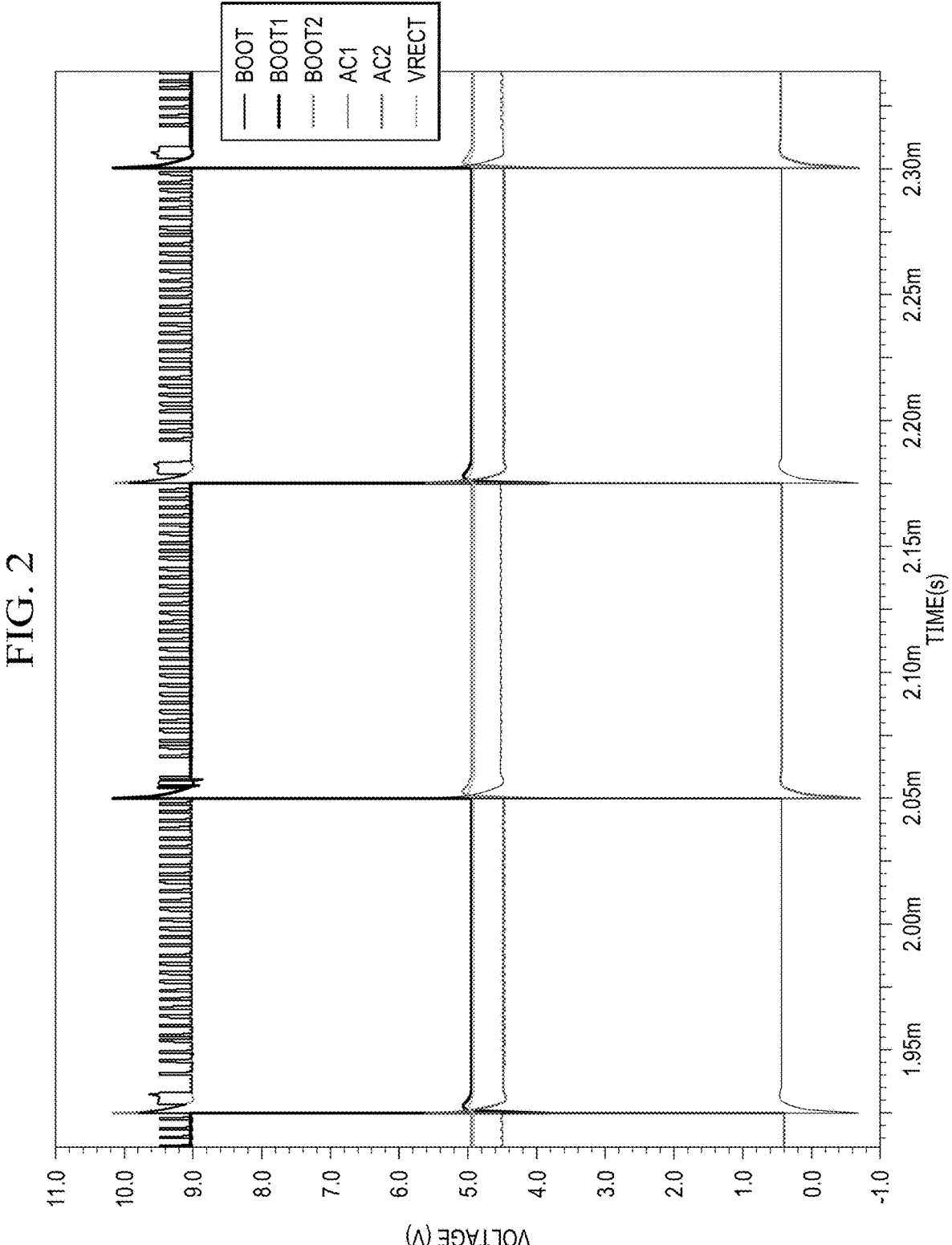
FIG. 2 is a graph showing voltage values of the system of FIG. 1 during operation.

To prevent this from happening, the charge pump circuit 10 generates the voltage BOOT to be at the first voltage above the rectified voltage VRECT, as can be observed in the graph of FIG. 2. During low-side conduction of the half-bridge formed by transistors MN2 and MN4 (which corresponds to high-side conduction of the half-bridge formed by transistors MN1 and MN2), switch S4 is closed to thereby tie node N2 (and voltage BOOT) to node N9 (and voltage BOOT2) to boost voltage BOOT2 sufficiently above the threshold voltage Vth that transistor MN3 remains turned on sufficiently and switch S5 is closed to charge voltage BOOT1 to 5V, as shown in FIG. 2.

Conversely, during low-side conduction of the half-bridge formed by transistors MN1 and MN3 (which corresponds to high-side conduction of the half-bridge formed by transistors MN2 and MN4), switch S3 is closed to thereby tie node N2 (and voltage BOOT) to node N8 (and voltage BOOT1) to boost voltage BOOT1 sufficiently above the threshold voltage Vth that transistor MN4 remains turned on sufficiently and switch S6 is closed to charge voltage BOOT2 to 5V, as also shown in FIG. 2.

The common-drain arrangement of the transistor MP1 is used to generate a feedback voltage at node N3, which is representative of the difference between BOOT and VRECT. This feedback voltage is compared to the reference voltage REF by the comparator 13, with the reference voltage REF being representative of the desired voltage level for BOOT to be above the rectified voltage VRECT.

When the voltage at node N3 becomes higher than VREF, the state machine 14 suitably operates the charge pump circuit 10 to cease pumping of the voltage BOOT; when the voltage at node N3 falls below VREF, the state machine 14 suitably operates the charge pump circuit 10 to pump the voltage BOOT to the first voltage above the rectified voltage VRECT. This overall has the effect of maintaining the voltage BOOT as being the first voltage above the rectified voltage VRECT, regardless of fluctuations of the rectified voltage VRECT, as further shown in FIG. 2.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A wireless charging and data transmission system, comprising:
   a full bridge formed by first and second half bridges coupled in parallel between a supply node and a ground node, with each half bridge comprised of a high-side transistor and a low-side transistor;
   a first high-side driving circuit for driving a control terminal of the high-side transistor of the first half bridge with a first bootstrap voltage at a first node during each high-side conduction period of the first half bridge;
   a second high-side driving circuit for driving a control terminal of the high-side transistor of the second half bridge with a second bootstrap voltage at a second node during each high-side conduction period of the second half bridge;
   a charge pump circuit configured to generate and maintain a master bootstrap voltage at a master node as being equal to a voltage at the supply node plus a given voltage; and
   a switch circuit configured to couple the master node to the second node during each low-side conduction period of the first half bridge, and to couple the master node to the first node during each low-side conduction period of the second half bridge.

2. The wireless charging and data transmission system of claim 1, wherein the charge pump circuit comprises:
   a charge pump configured to boost a base voltage based upon received control signals; and
   a switch configured to selectively couple the charge pump to the master node.

3. The wireless charging and data transmission system of claim 1, wherein the charge pump circuit comprises:
   a capacitor coupled between the master node and the voltage at the supply node and holding the master bootstrap voltage;
   a feedback voltage circuit coupled between the master node and ground, and configured to generate a feedback voltage representative of the master bootstrap voltage;
   a comparator configured to compare the feedback voltage to a reference voltage and generate a comparison output based thereupon; and
   a control circuit configured to generate control signals for the charge pump based upon the comparison output.

4. The wireless charging and data transmission system of claim 1, wherein the first high-side driving circuit comprises:
   a first driver powered between the first node and a voltage at a tap between the high and low side transistors of the first half bridge; and
   a first bootstrap capacitor coupled between the first node and the tap between the high and low side transistors of the first half bridge.

5. The wireless charging and data transmission system of claim 4, wherein the second high-side driving circuit further comprises:
   a second driver powered between the second node and a voltage at a tap between the high and low side transistors of the second half bridge; and

8 a second bootstrap capacitor coupled between the second node and the tap between the high and low side transistors of the second half bridge.

6. A method of operating a wireless charging and data transmission system, the method comprising:
   generating a master bootstrap voltage to be a first voltage above a rectified voltage, using a charge pump circuit;
   during low-side conduction of a first half-bridge formed by second and fourth transistors, closing a fourth switch to tie a second node to a ninth node, boosting a second bootstrap voltage above a threshold voltage that keeps a third transistor sufficiently turned on, and closing a fifth switch to charge a first bootstrap voltage to a supply voltage;
   during low-side conduction of a second half-bridge formed by the first and third transistors, closing a third switch to tie the first node to an eighth node, boosting the first bootstrap voltage above a threshold voltage that keeps the fourth transistor sufficiently turned on, and closing a sixth switch to charge the second bootstrap voltage to the supply voltage;
   generating a feedback voltage at a third node using a common-drain arrangement of a fifth transistor, the feedback voltage being representative of a difference between the master bootstrap voltage and the rectified voltage;
   comparing the feedback voltage to a reference voltage using a comparator, the reference voltage being representative of a desired voltage level for the master bootstrap voltage to be above the rectified voltage; and
   controlling operation of the charge pump circuit using a state machine based on the comparison of the feedback voltage and the reference voltage, such that the operation ceases when the feedback voltage becomes higher than the reference voltage and resumes when the feedback voltage falls below the reference voltage.

7. The method of claim 6, further comprising maintaining the master bootstrap voltage as being the first voltage above the rectified voltage regardless of fluctuations in the rectified voltage as a result of the controlling of the operation of the charge pump circuit using the state machine.

8. A wireless charging and data transmission system, comprising:
   a full bridge formed by two half bridges, each half bridge having a high-side transistor and a low-side transistor;
   first and second high-side driving circuits driving the high-side transistors with bootstrap voltages during low-side conduction periods;
   a charge pump circuit maintaining a master bootstrap voltage equal to a supply node voltage plus a given voltage; and
   a switch circuit coupling the master bootstrap voltage to first or second nodes during the respective low-side conduction periods of the half bridges.

9. The system of claim 8, further comprising: a capacitor holding the master bootstrap voltage; a feedback circuit generating a voltage representative of the master bootstrap voltage; a comparator comparing the voltage representative of the master bootstrap voltage to a reference voltage and generating a comparison output based thereupon; and a control circuit controlling the charge pump circuit based on the comparison output.

10. The system of claim 8, wherein the first high-side driving circuit comprises: a driver powered between the first node and a tap of the first half bridge; and a first bootstrap capacitor coupled between the first node and the tap of the first half bridge.

11. The system of claim 10, wherein the second high-side driving circuit comprises: a driver powered between the second node and a tap of the second half bridge; and a second bootstrap capacitor coupled between the second node and the tap of the second half bridge.

12. A method of operating a wireless charging and data transmission system, the method comprising:

driving a control terminal of a high-side transistor of a first half bridge of a full bridge with a first bootstrap voltage at a first node during each high-side conduction period of the first half bridge;

driving a control terminal of a high-side transistor of a second half bridge of the full bridge with a second bootstrap voltage at a second node during each high-side conduction period of the second half bridge;

generating and maintaining a master bootstrap voltage at a master node as being equal to a voltage at a supply node plus a given voltage; and coupling the master node to the second node during each low-side conduction period of the first half bridge, and coupling the master node to the first node during each low-side conduction period of the second half bridge.

13. The method of claim 12, further comprising generating a feedback voltage representative of a difference between the master bootstrap voltage and a rectified voltage and controlling generation of the master bootstrap voltage so that it is maintained as being a desired voltage level above the rectified voltage.

14. The method of claim 13, further comprising comparing the feedback voltage to a reference voltage representative of the desired voltage level for the master bootstrap voltage to be above the rectified voltage, and controlling generation of the master bootstrap voltage so that it is maintained as being the desired voltage level above the rectified voltage.

15. The method of claim 12, further comprising maintaining the master bootstrap voltage as being the first voltage above the rectified voltage regardless of fluctuations in the rectified voltage as a result of the controlling of the operation of the charge pump circuit using the state machine.

* * * * *